(12) United States Patent
Kakutani et al.

(10) Patent No.: US 11,579,814 B2
(45) Date of Patent: Feb. 14, 2023

(54) INFORMATION PROCESSING APPARATUS THAT REDUCES LABOR AND TIME FOR INSTRUCTION IN RESERVATION PRINTING, AND CONTROL METHOD FOR INFORMATION PROCESSING APPARATUS

(71) Applicant: CANON KABUSHIKI KAISHA, Tokyo (JP)

(72) Inventors: Naoya Kakutani, Chiba (JP); Akira Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/465,670

(22) Filed: Sep. 2, 2021

(65) Prior Publication Data

US 2022/0075570 A1     Mar. 10, 2022

(30) Foreign Application Priority Data

Sep. 4, 2020   (JP) .............................. JP2020-149261

(51) Int. Cl.
   *G06F 15/00*    (2006.01)
   *G06F 3/12*     (2006.01)
   *G06K 1/00*     (2006.01)
(52) U.S. Cl.
   CPC ............ *G06F 3/1204* (2013.01); *G06F 3/126* (2013.01); *G06F 3/1286* (2013.01)
(58) Field of Classification Search
   CPC ....... G06F 3/1204; G06F 3/126; G06F 3/1286

USPC ............................... 358/1.15, 1.14, 1.13, 1.1
See application file for complete search history.

(56) References Cited

U.S. PATENT DOCUMENTS

| | | | | |
|---|---|---|---|---|
| 2007/0081186 A1* | 4/2007 | Numata | ................ | G06F 3/1212 358/1.15 |
| 2012/0206763 A1* | 8/2012 | Yoshida | ................ | G06F 3/1263 358/1.15 |
| 2016/0065751 A1* | 3/2016 | Park | ...................... | G06F 3/1253 358/1.15 |
| 2021/0006672 A1* | 1/2021 | Matsunaga | .......... | H04N 1/0092 |

FOREIGN PATENT DOCUMENTS

JP         2014-159123 A       9/2014

* cited by examiner

*Primary Examiner* — Douglas Q Tran
(74) *Attorney, Agent, or Firm* — Canon U.S.A., Inc. IP Division

(57) ABSTRACT

An information processing apparatus capable of reducing the labor and time expended by a user for an instruction in reservation printing is provided. The information processing apparatus performs communication with a server for storing files and an image forming apparatus for printing files. The information processing apparatus includes a file obtaining unit configured to obtain files shown in a print candidate file list generated based on a priority setting indicating priorities of files stored in the server among a plurality of files stored in the server, and a transmission unit configured to transmit the obtained files to the image forming apparatus.

8 Claims, 14 Drawing Sheets

FIG. 8

PRINT DESIGNATION SCREEN — 801

RECEIVED PRINT DATA LIST — 802

| SELECT | NUMBER | FILE NAME | USER NAME | STATE | DATE |
|---|---|---|---|---|---|
| ✓ | 0001 | Doc1.doc | User1 | WAITING | 2020/07/01/ 16:30 |
| ☐ | 0002 | Sheet2.xls | User1 | WAITING | 2020/07/01/ 16:00 |
| ☐ | | | | | |
| ☐ | | | | | |
| ☐ | | | | | |

ESTIMATED PRINT DATA LIST

| SELECT | NUMBER | FILE NAME | USER NAME | STATE | DATE | ACQUISITION DESTINATION — 803 |
|---|---|---|---|---|---|---|
| ✓ | 0001 | Doc2.doc | User1 | WAITING | 2020/07/01/ 17:30 | Cloud ServiceA |
| ☐ | 0002 | Doc3.pdf | User1 | WAITING | 2020/07/01/ 16:00 | Cloud ServiceA |
| ☐ | 0003 | poster.ppt | User1 | WAITING | 2020/07/01/ 15:00 | Cloud ServiceA |
| ☐ | 0004 | text.txt | User1 | WAITING | 2020/06/30/ 21:00 | Cloud ServiceA |
| ☐ | 0005 | Sheet3.xls | User1 | WAITING | 2020/06/30/ 18:00 | Cloud ServiceA |

TERMINATE    PRINT — 804

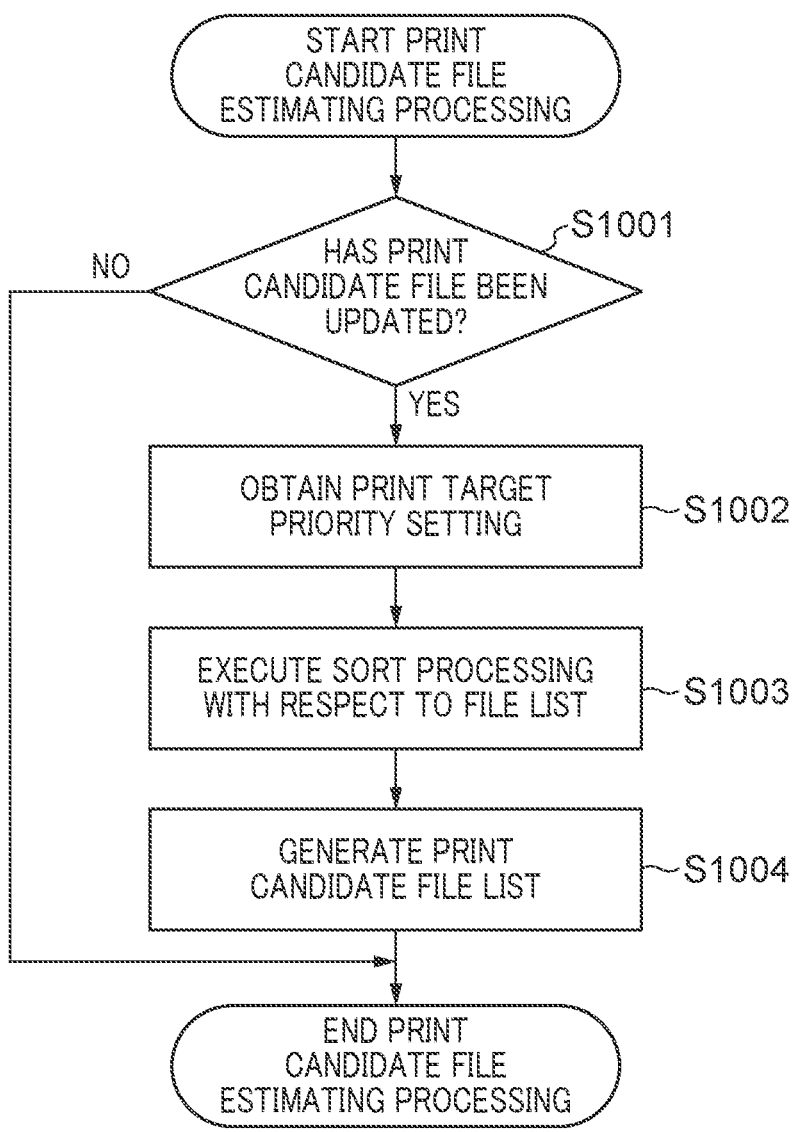

INFORMATION PROCESSING APPARATUS THAT REDUCES LABOR AND TIME FOR INSTRUCTION IN RESERVATION PRINTING, AND CONTROL METHOD FOR INFORMATION PROCESSING APPARATUS

BACKGROUND

Field

The present disclosure relates to an information processing apparatus that reduces the labor and time a user is required to expend for an instruction in reservation printing, and a control method for the information processing apparatus.

Description of the Related Art

An image forming apparatus having a printing function is known. In some instances of such image forming apparatuses, the image forming apparatus can temporarily retain a file received from an external device without immediately printing the file, and print the retained file according to an instruction inputted into an operating panel of the image forming apparatus by a user (for example, see Japanese Laid-Open Patent Publication (Kokai) No. 2014-159123). Such printing is generally called, among other things, reservation printing, secure printing, authentication printing, or cloud printing. In reservation printing, the user operates a personal computer (PC) or a smartphone to select a file that is a print target from a plurality of files that are stored in an in-house file server, a cloud storage, or the like, and then issue an instruction that transmits the file that is the print target to the image forming apparatus.

However, in reservation printing, as described above, since it is necessary for the user to operate the PC or the smartphone to retrieve the file that is the print target and then issue the instruction that transmits the retrieved file that is the print target, it inconveniences the user by requiring the user to expend labor and time on these operations.

SUMMARY

Various embodiments of the present disclosure provide an information processing apparatus capable of reducing the labor and time a user is required to expend for an instruction in reservation printing, and a control method for the information processing apparatus.

According to one embodiment, an information processing apparatus is provided that performs communication with a server for storing files and an image forming apparatus for printing files. The information processing apparatus includes a file obtaining unit configured to obtain files shown in a print candidate file list generated based on a priority setting indicating priorities of files stored in the server among a plurality of files stored in the server, and a transmission unit configured to transmit the obtained files to the image forming apparatus.

Further features of the present disclosure will become apparent from the following description of exemplary embodiments with reference to the attached drawings.

BRIEF DESCRIPTION OF THE DRAWINGS

FIG. 8 is a diagram that shows an example of a reservation printing function screen displayed on an operating panel of the multifunction peripheral of FIG. 2A according to one embodiment.

FIG. 10 is a flowchart that shows procedures of a print candidate file estimating processing of a step S905 of FIG. 9 according to one embodiment.

DESCRIPTION OF THE EMBODIMENTS

Various embodiments of the present disclosure will now be described in detail below with reference to the accompanying drawings showing embodiments thereof.

First, an information processing apparatus according to a first embodiment of the present disclosure will be described.

Figure 1:
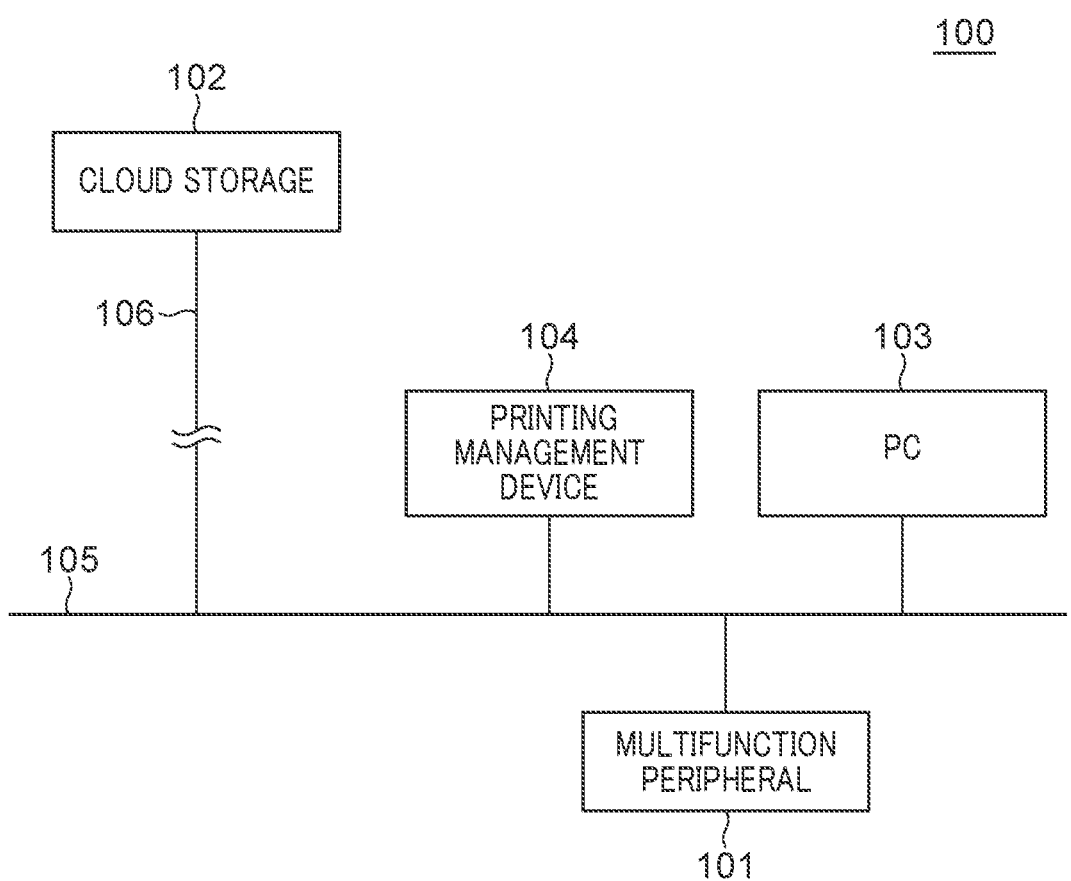
FIG. 1 is a block diagram that schematically shows a configuration of a printing system including a printing management device as an information processing apparatus according to a first embodiment of the present disclosure.

FIG. 1 is a block diagram that schematically shows a configuration of a printing system 100 including a printing management device 104 as an information processing apparatus according to the first embodiment of the present disclosure. As shown in FIG. 1, the printing system 100 has a multifunction peripheral 101 as an image forming apparatus, a cloud storage 102 as a server, a PC 103, and the printing management device 104. Further, in the first embodiment, as an example, a configuration that the printing system 100 includes one image forming apparatus, one server, one PC, and one information processing apparatus will be described, but the present invention is not limited to this configuration. For example, the printing system 100 may be configured to include a plurality of image forming apparatuses, a plurality of servers, a plurality of PCs, and a plurality of printing management devices. In the printing system 100, the multifunction peripheral 101 can communicate with the PC 103 and the printing management device 104 via a network 105. Further, in the printing system 100, the PC 103 and the printing management device 104 can communicate with the cloud storage 102 via the network 105 and an external network 106.

The multifunction peripheral 101 has a copy function, a scan function, a communication function, and the like. Further, the multifunction peripheral 101 performs reservation printing. In the reservation printing, the multifunction peripheral 101 temporarily retains a file received from the printing management device 104 or the like without immediately printing the file, and prints the retained file according to an execution instruction issued by a user who logged into the multifunction peripheral 101.

The cloud storage 102 stores files having extensions such as "pptx", "doc", "pdf", and "zip" that are generated by the user operating the PC 103. The printing management device 104 supports a print processing executed by the multifunction peripheral 101. For example, the printing management device 104 obtains files stored in the cloud storage 102 and transmits the obtained files to the multifunction peripheral 101.

Figure 2A:
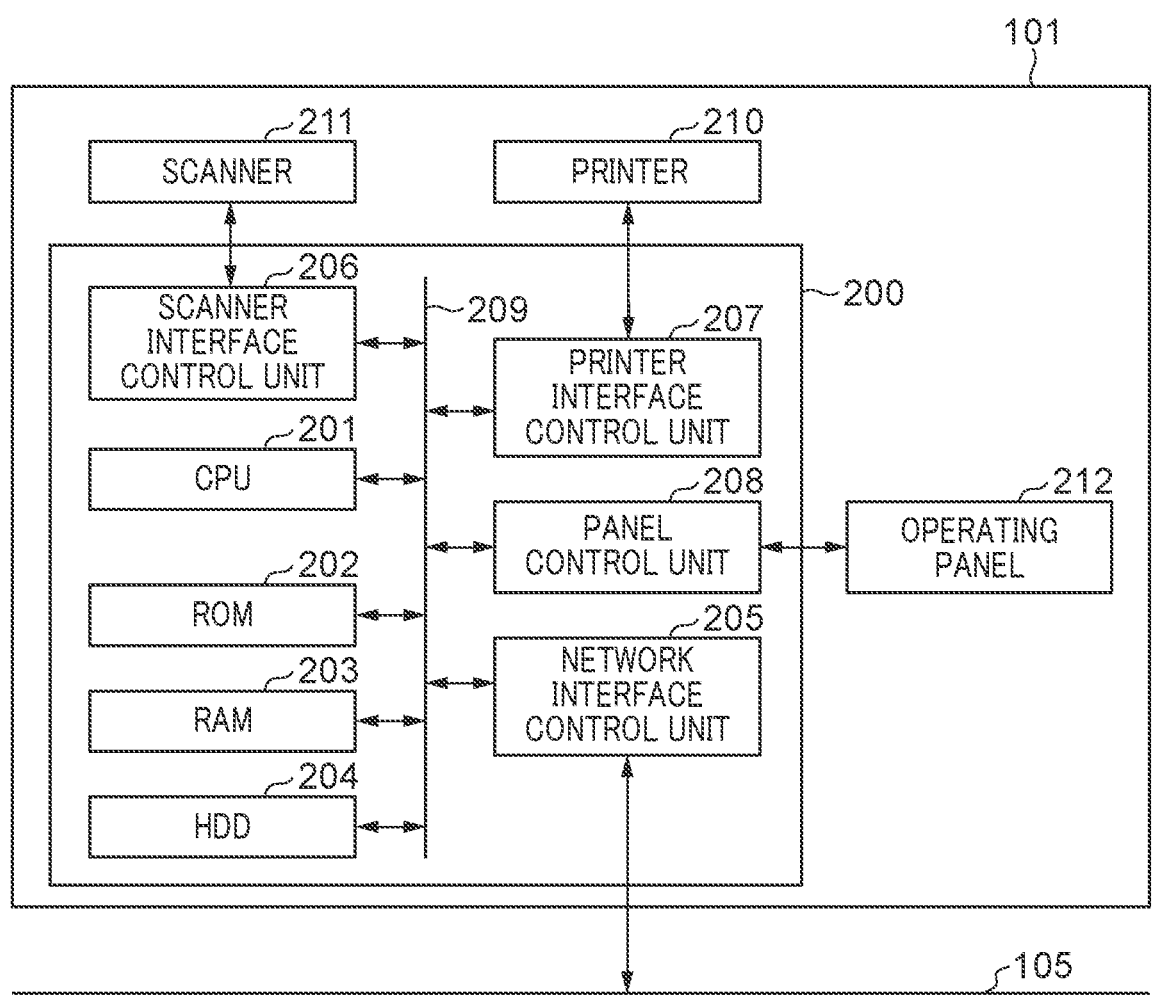
FIG. 2A is a block diagram that schematically shows a hardware configuration of a multifunction peripheral of FIG. 1 according to one embodiment.
Figure 2B:
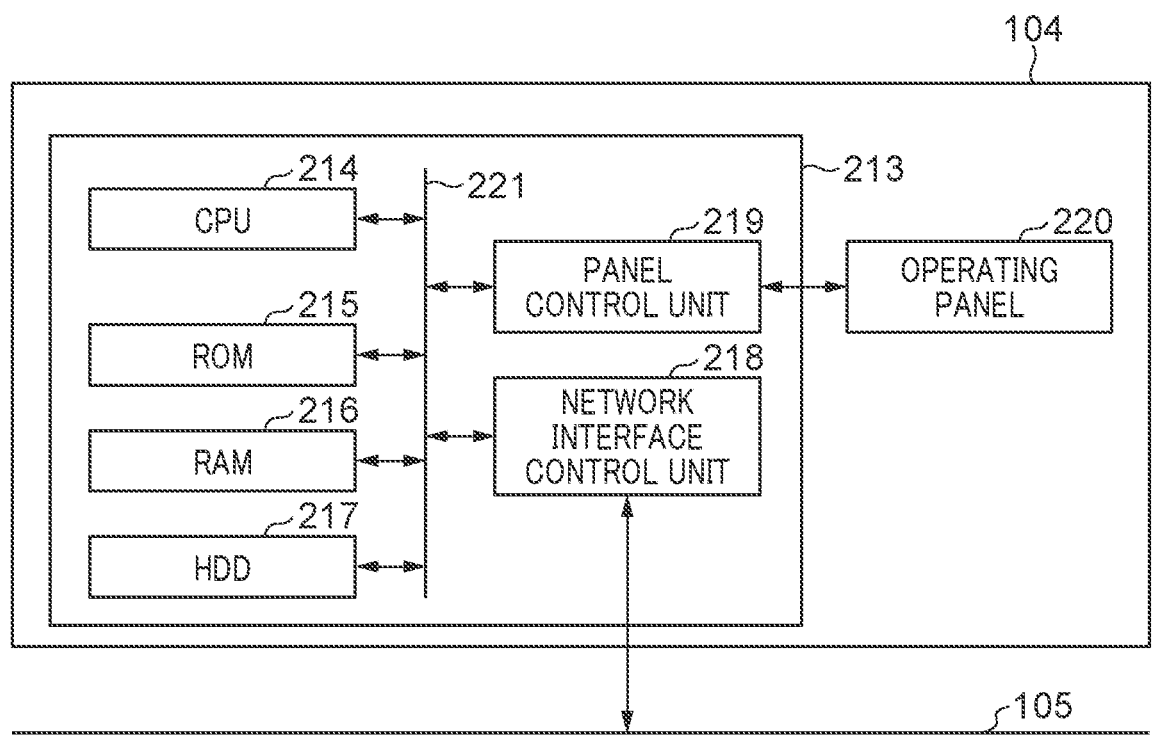
FIG. 2B is a block diagram that schematically shows a hardware configuration of the printing management device of FIG. 1.

FIG. 2A is a block diagram that schematically shows a hardware configuration of the multifunction peripheral 101 of FIG. 1, and FIG. 2B is a block diagram that schematically shows a hardware configuration of the printing management device 104 of FIG. 1. FIG. 2A shows the hardware configuration of the multifunction peripheral 101. As shown in FIG. 2A, the multifunction peripheral 101 has a control unit 200, a printer 210, a scanner 211, and an operating panel 212. The control unit 200 is connected to the printer 210, the scanner 211, and the operating panel 212, respectively. Further, the control unit 200 includes a CPU (Central Processing Unit) 201, a ROM (Read Only Memory) 202, a RAM (Random Access Memory) 203, an HDD (Hard Disk Drive) 204, a network interface control unit 205, a scanner interface control unit 206, a printer interface control unit 207, and a panel control unit 208. The CPU 201, the ROM 202, the RAM 203, the HDD 204, the network interface control unit 205, the scanner interface control unit 206, the printer interface control unit 207, and the panel control unit 208 are connected to each other via a bus 209.

The CPU 201 executes software programs of the multifunction peripheral 101 and controls an entire multifunction peripheral 101. The ROM 202 stores boot programs, fixed parameters, etc. of the multifunction peripheral 101. The RAM 203 is used as a temporary storage area for temporarily storing programs, intermediate data, and the like when the CPU 201 controls operations of the multifunction peripheral 101. The HDD 204 stores system software, applications, and various kinds of data. The CPU 201 controls the operations of the multifunction peripheral 101 by executing the boot programs stored in the ROM 202, expanding programs stored in the HDD 204 to the RAM 203, and executing the expanded programs.

The network interface control unit 205 controls transmission/reception of data with the network 105. The scanner interface control unit 206 controls an original document reading processing performed by the scanner 211. The printer interface control unit 207 controls the print processing, etc. performed by the printer 210. The panel control unit 208 controls the touch panel type operating panel 212. For example, the panel control unit 208 displays various kinds of information on the operating panel 212 that functions as a display device, and also obtains instructions, for example, execution instructions of scan and print, inputted into the operating panel 212 by the user from the operating panel 212.

FIG. 2B shows the hardware configuration of the printing management device 104. As shown in FIG. 2B, the printing management device 104 has a control unit 213, and an operating panel 220. The control unit 213 is connected to the operating panel 220. Further, the control unit 213 includes a CPU 214, a ROM 215, a RAM 216, an HDD 217, a network interface control unit 218, and a panel control unit 219. The CPU 214, the ROM 215, the RAM 216, the HDD 217, the network interface control unit 218, and the panel control unit 219 are connected to each other via a bus 221.

The CPU 214 executes software programs of the printing management device 104 and controls an entire printing management device 104. The ROM 215 stores boot programs, fixed parameters, etc. of the printing management device 104. The RAM 216 is used as a temporary storage area for temporarily storing programs, intermediate data, and the like when the CPU 214 controls operations of the printing management device 104. The HDD 217 stores system software, applications, and various kinds of data. The CPU 214 controls the operations of the printing management device 104 by executing the boot programs stored in the ROM 215, expanding programs stored in the HDD 217 to the RAM 216, and executing the expanded programs. The network interface control unit 218 controls transmission/reception of data with the network 105. The panel control unit 219 controls the touch panel type operating panel 220. For example, the panel control unit 219 displays various kinds of information on the operating panel 220, and also obtains instructions inputted into the operating panel 220 by the user from the operating panel 220.

Figure 3A:
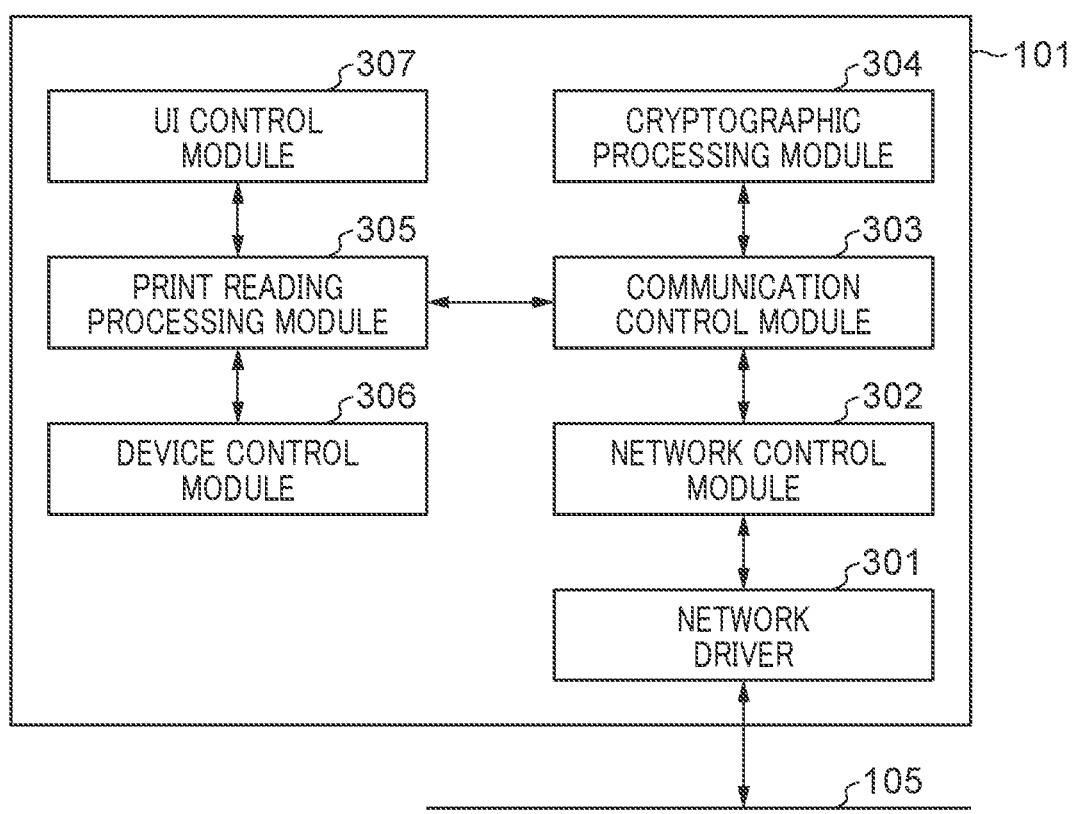
FIG. 3A is a block diagram that schematically shows a software configuration of the multifunction peripheral of FIG. 1 according to one embodiment.
Figure 3B:
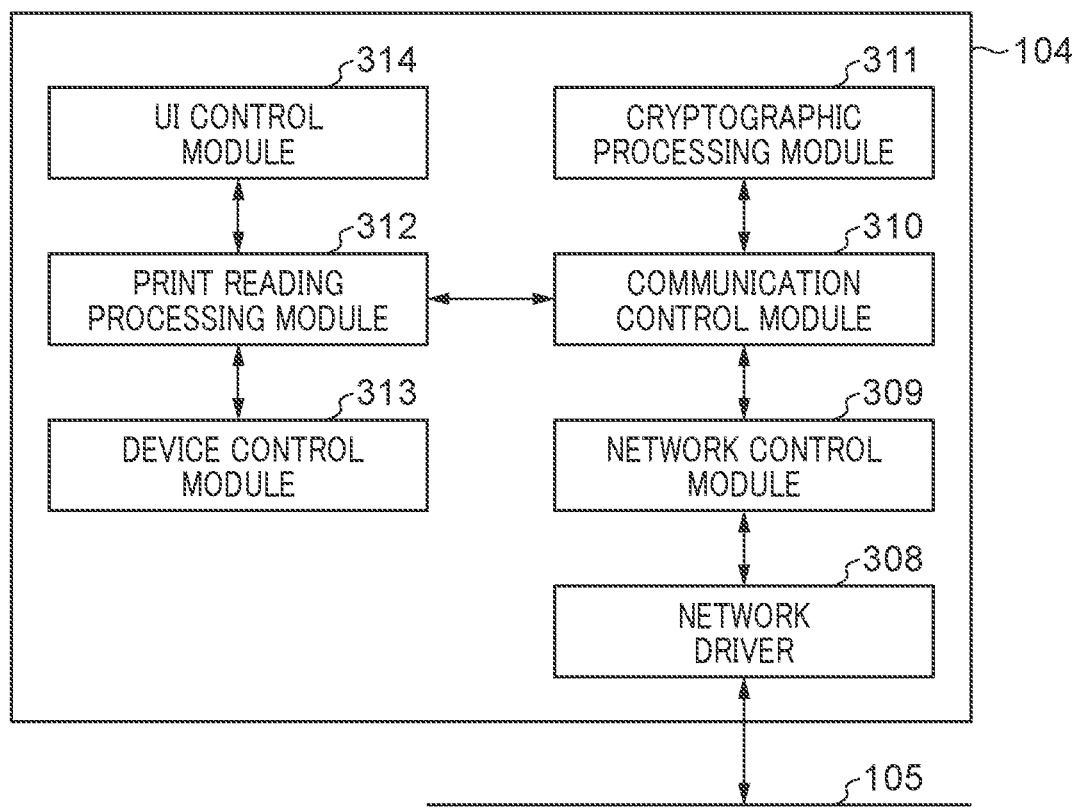
FIG. 3B is a block diagram that schematically shows a software configuration of the printing management device of FIG. 1 according to one embodiment.

FIG. 3A is a block diagram that schematically shows a software configuration of the multifunction peripheral 101 of FIG. 1, and FIG. 3B is a block diagram that schematically shows a software configuration of the printing management device 104 of FIG. 1. FIG. 3A shows the software configuration of the multifunction peripheral 101. As shown in FIG. 3A, the multifunction peripheral 101 has a network driver 301, a network control module 302, a communication control module 303, a cryptographic processing module 304, a print reading processing module 305, a device control module 306, and a UI (User Interface) control module 307. The processing of these modules is realized by the CPU 201 executing the program expanded in the RAM 203.

The network driver 301 controls the network interface control unit 205 and performs transmission/reception of data with an external device via the network 105. The network control module 302 controls communications below a transport layer in a network communication protocol such as TCP/IP (Transmission Control Protocol/Internet Protocol) and performs transmission/reception of data. The communication control module 303 is a module for controlling a plurality of communication protocols that are supported by the multifunction peripheral 101. For example, encrypted communication such as TLS (Transport Layer Security) supported by the multifunction peripheral 101 is executed by the communication control module 303.

The cryptographic processing module 304 is a module for executing various kinds of cryptographic processing such as data encryption, data decryption, electronic signature generation, electronic signature verification, and hash value generation. For example, in the encrypted communication process such as TLS executed by the communication control module 303, the cryptographic processing module 304 executes an encryption processing.

The print reading processing module 305 is a module for executing the print processing performed by the printer 210, the original document reading processing performed by the scanner 211, etc. The device control module 306 is a module for generating control commands and control data of the multifunction peripheral 101 and performing an overall control of the multifunction peripheral 101. The UI control module 307 is a module for controlling the operating panel 212 and the panel control unit 208.

FIG. 3B shows the software configuration of the printing management device 104. As shown in FIG. 3B, the printing management device 104 has a network driver 308, a network control module 309, a communication control module 310, a cryptographic processing module 311, a print reading processing module 312, a device control module 313, and a UI control module 314. The processing of these modules is realized by the CPU 214 executing the program expanded in the RAM 216.

The network driver 308 controls the network interface control unit 218 and performs transmission/reception of data with the external device via the network 105. The network control module 309 controls the communications below the transport layer in the network communication protocol such as TCP/IP and performs transmission/reception of data. The communication control module 310 is a module for controlling a plurality of communication protocols that are supported by the printing management device 104. For example, encrypted communication such as TLS supported by the printing management device 104 is executed by the communication control module 310.

The cryptographic processing module 311 is a module for executing various kinds of cryptographic processing such as data encryption, data decryption, electronic signature generation, electronic signature verification, and hash value generation. For example, in the encrypted communication process such as TLS executed by the communication control module 310, the cryptographic processing module 311 executes an encryption processing.

The print reading processing module 312 is a module for supporting execution of the print processing performed by the printer 210 of the multifunction peripheral 101, the original document reading processing performed by the scanner 211 of the multifunction peripheral 101, etc. The device control module 313 is a module for generating control commands and control data of the printing management device 104 and performing an overall control of the printing management device 104. The UI control module 314 is a module for controlling the operating panel 220 and the panel control unit 219.

Figure 4:
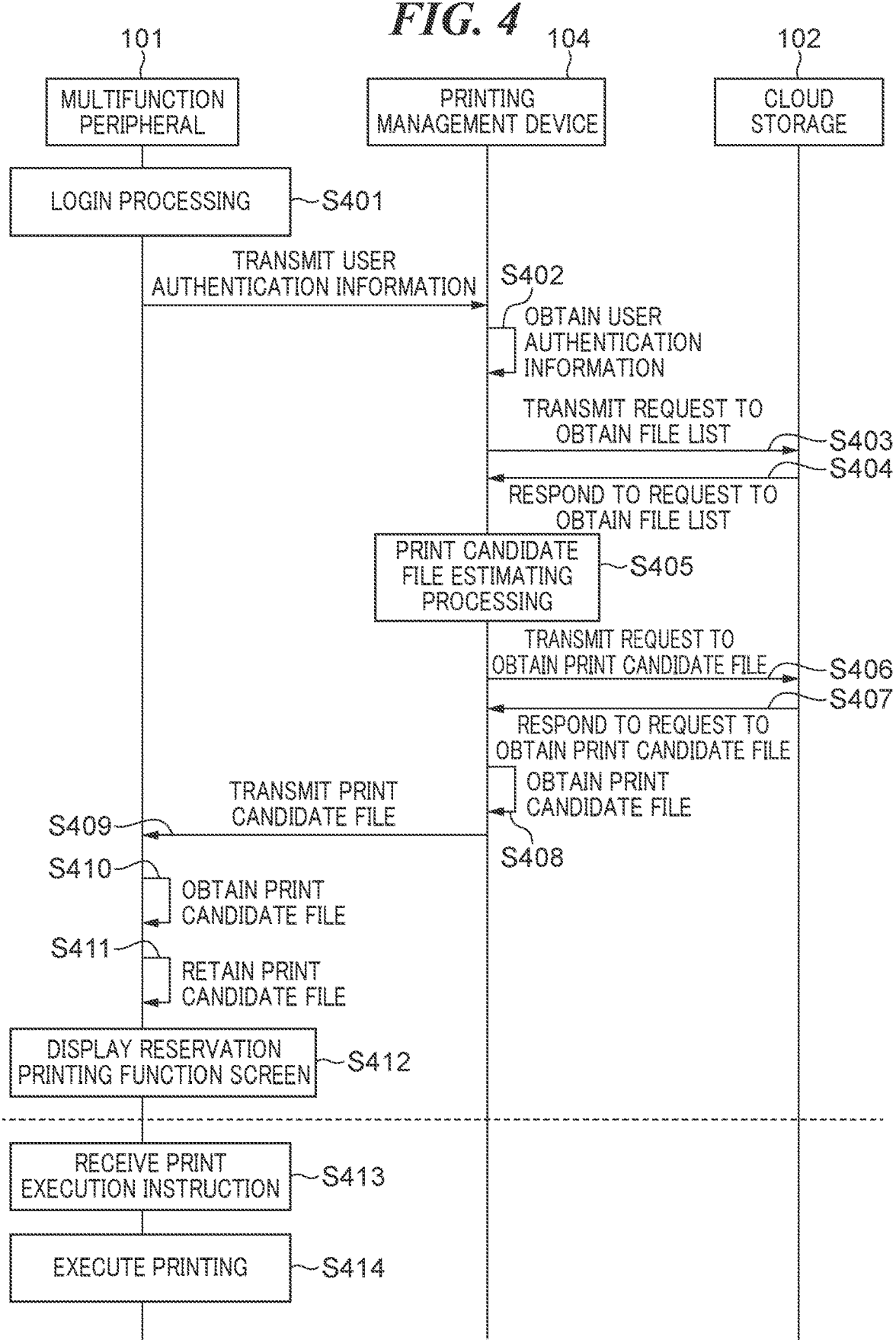
FIG. 4 is a sequence diagram for explaining a series of flows of the multifunction peripheral from receiving a login request by a user to executing a print processing in the printing system of FIG. 1 according to one embodiment.

FIG. 4 is a sequence diagram for explaining a series of flows of the multifunction peripheral 101 from receiving a login request by the user to executing the print processing in the printing system 100 of FIG. 1. In FIG. 4, each processing executed by the multifunction peripheral 101 is realized by the CPU 201 of the multifunction peripheral 101 executing the program expanded in the RAM 203. Further, in FIG. 4, each processing executed by the printing management device 104 is realized by the CPU 214 of the printing management device 104 executing the program expanded in the RAM 216.

Figure 5:
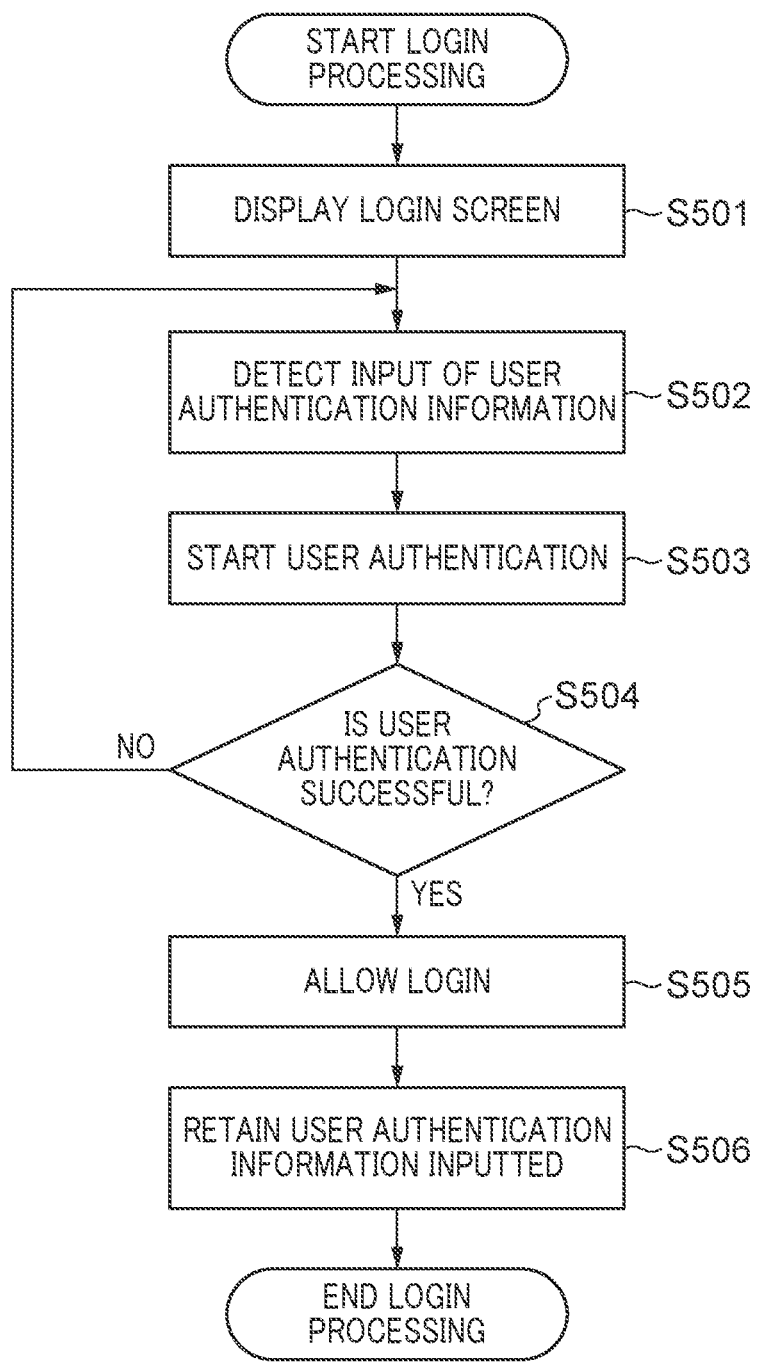
FIG. 5 is a flowchart that shows procedures of a login processing of a step S401 of FIG. 4 according to one embodiment.

As shown in FIG. 4, at first, the CPU 201 of the multifunction peripheral 101 executes a login processing of FIG. 5 (a step S401).

FIG. 5 is a flowchart that shows procedures of the login processing of the step S401 of FIG. 4. As shown in FIG. 5, the CPU 201 causes the operating panel 212 to display a login screen (not shown) (a step S501). When the CPU 201 detects that the user has inputted user authentication information including a user ID (identification) and a password into the login screen (a step S502), the CPU 201 starts user authentication by using the user authentication information (a step S503). Next, the CPU 201 determines whether or not the user authentication is successful (a step S504). In the user authentication, for example, the CPU 201 collates the user authentication information inputted into the login screen with a plurality of registration information pre-registered. The registration information includes a user ID and a password, and is stored in advance in the HDD 204 or the like. In the case that the user authentication information inputted into the login screen corresponds to any one of the plurality of registration information described above, for example, in the case that the user authentication information inputted into the login screen and any one of the plurality of registration information described above accord, the CPU 201 determines that the user authentication is successful. On the other hand, in the case that the user authentication information inputted into the login screen does not correspond to any of the plurality of registration information described above, the CPU 201 determines that the user authentication is failed.

If a result of a determination in the step S504 is that the user authentication is failed, the CPU 201 displays an error screen indicating that the user authentication is failed on the operating panel 212, and the login processing returns to the step S502. If the result of the determination in the step S504 is that the user authentication is successful, the CPU 201 allows the user who has inputted the user authentication information to log into the multifunction peripheral 101 (a step S505). As a result, the user can use various functions of the multifunction peripheral 101, and for example, can instruct the multifunction peripheral 101 to start printing a file retained in the multifunction peripheral 101. Next, the CPU 201 retains the user authentication information inputted by the user in the step S502 in the RAM 203 (a step S506), and the login processing ends.

Returning to FIG. 4, when the login processing is completed, the CPU 201 transmits the user authentication information retained in the RAM 203 to the printing management device 104.

The CPU 214 of the printing management device 104 that functions as a user authentication information obtaining unit obtains the user authentication information from the multifunction peripheral 101 (a step S402), and then transmits a request to obtain a file list from a user corresponding to the user authentication information (hereinafter referred to as "a file list obtaining request") to the cloud storage 102 (a step S403). This file list includes names, file formats, update date and time, etc. of files generated by the user corresponding to the user authentication information (hereinafter referred to as "user authentication information corresponding files") among a plurality of files retained in the cloud storage 102. Moreover, in the first embodiment, the above file list may not include information about non-printable user authentication information corresponding files such as files having a "zip" extension.

The cloud storage 102 responds to the file list obtaining request received from the printing management device 104 (a step S404). Specifically, the cloud storage 102 transmits a file list corresponding to the file list obtaining request to the printing management device 104. The CPU 214 of the printing management device 104 executes a print candidate file estimating processing of FIG. 6 on the basis of the file list received from the cloud storage 102 (a step S405).

Figure 6:
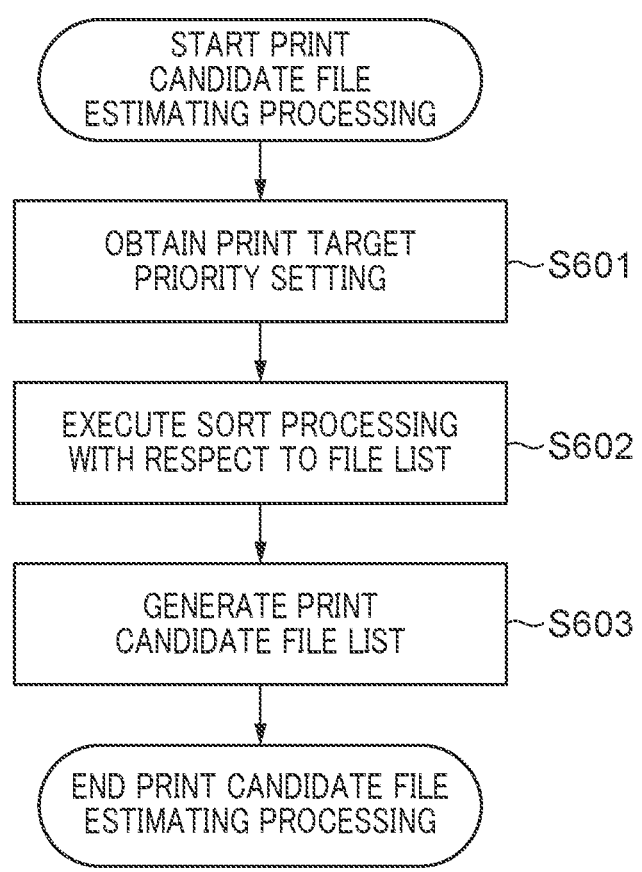
FIG. 6 is a flowchart that shows procedures of a print candidate file estimating processing of a step S405 of FIG. 4 according to one embodiment.

FIG. 6 is a flowchart that shows procedures of the print candidate file estimating processing of the step S405 of FIG. 4. Further, in the print candidate file estimating processing of FIG. 6, it is assumed that a print target priority setting indicating priorities of the files stored in the cloud storage 102 is already stored in the HDD 217. In the first embodiment, in an estimated print data list 803 of a reservation printing function screen 801 of FIG. 8 that will be described later, names of the files obtained from the cloud storage 102 by the multifunction peripheral 101 via the printing management device 104 are displayed in a descending order of the priorities in the print target priority setting.

Figure 7A:
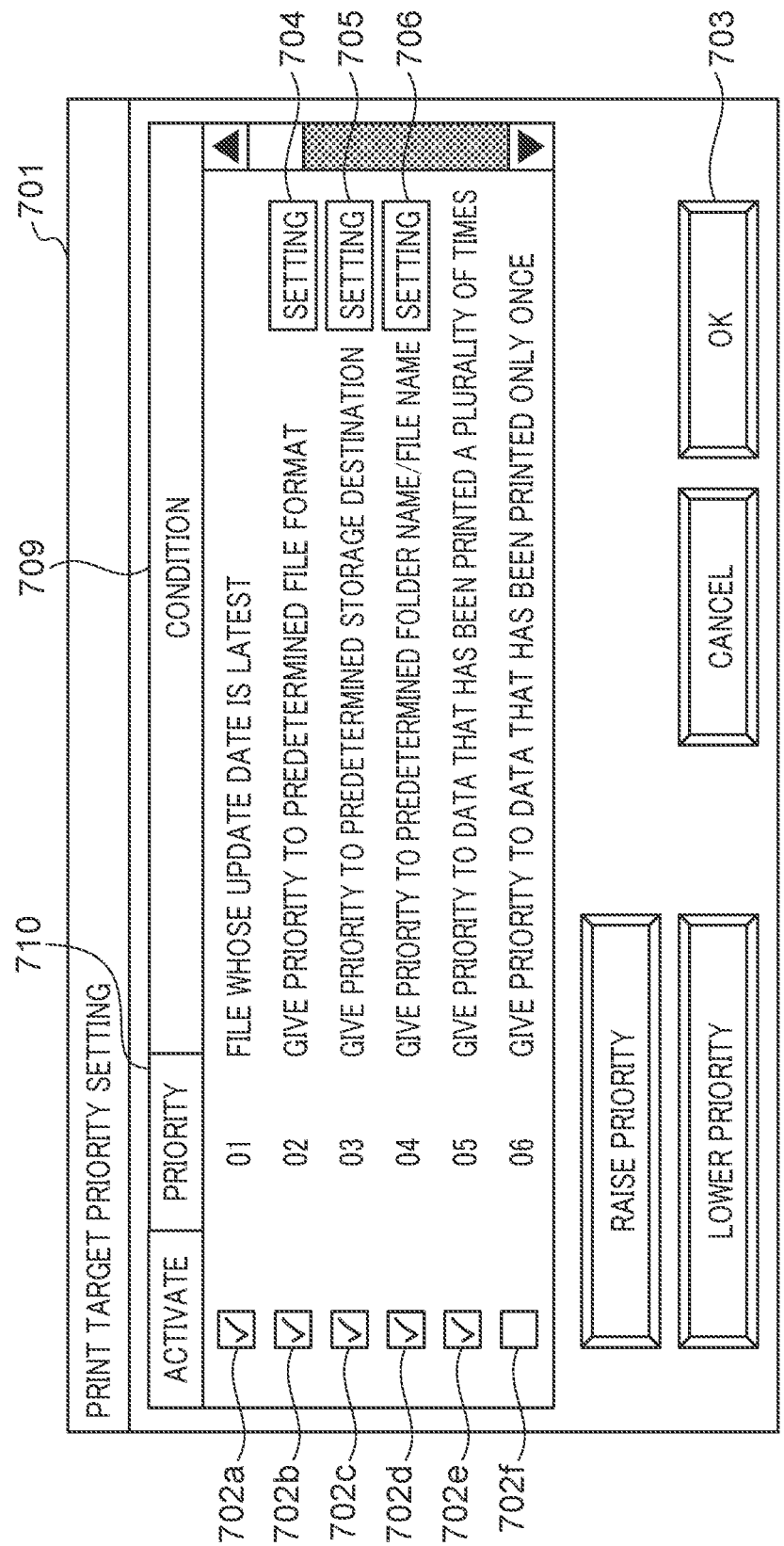
FIGS. 7A, 7B and 7C are diagrams that show an example of a setting screen displayed on an operating panel of the printing management device of FIG. 2B according to one embodiment.

As shown in FIG. 6, the CPU 214 obtains the print target priority setting from the HDD 217 (a step S601). In the first embodiment, it is possible for the user such as an administrator of the printing system 100 to set the print target priority setting in a setting screen 701 of FIG. 7A that is displayed on the operating panel 220, and the print target priority setting is stored in the HDD 217. Moreover, the setting screen 701 may be displayed on a device other than the operating panel 220, for example, the setting screen 701 may be displayed on the PC 103 as a remote UI that is provided by the printing management device 104 via the network 105.

On the setting screen 701, when a OK button 703 is pressed in a selected state that any one of activating buttons 702a to 702f is selected, a condition 709 corresponding to the activating button in the selected state is set as a condition to determine a display order of the files in the estimated print data list 803 that will be described later.

For example, when a condition 709 corresponding to the activating button 702a is set, the user authentication information corresponding files whose update date and time are the latest, are displayed at a top of the estimated print data list 803 that will be described later. Further, when a condition 709 corresponding to the activating button 702b is set, the user authentication information corresponding files that have a file format set by selecting a setting button 704, are displayed at the top of the estimated print data list 803 that will be described later. For example, the administrator selects the setting button 704 to set a printable file format such as "pptx", "doc", "pdf".

Further, when a condition 709 corresponding to the activating button 702c is set, the user authentication information corresponding files that are stored in a folder set by selecting a setting button 705, are displayed at the top of the estimated print data list 803 that will be described later. Furthermore, when a condition 709 corresponding to the activating button 702d is set, the user authentication information corresponding files that have a name set by selecting a setting button 706, are displayed at the top of the estimated print data list 803 that will be described later. Further, when a condition 709 corresponding to the activating button 702e is set, the user authentication information corresponding files that have been printed a plurality of times, are displayed at the top of the estimated print data list 803 that will be described later. Furthermore, when a condition 709 corresponding to the activating button 702f is set, the user authentication information corresponding files that have been printed only once, are displayed at the top of the estimated print data list 803 that will be described later. Moreover, the priority of a condition 709 corresponding to the activating button in an unselected state is set to the lowest. For example, in a case that the activating button 702f is in the unselected state, the user authentication information corresponding files that have been printed only once, are displayed at a bottom of the estimated print data list 803 that will be described later.

Figure 7B:
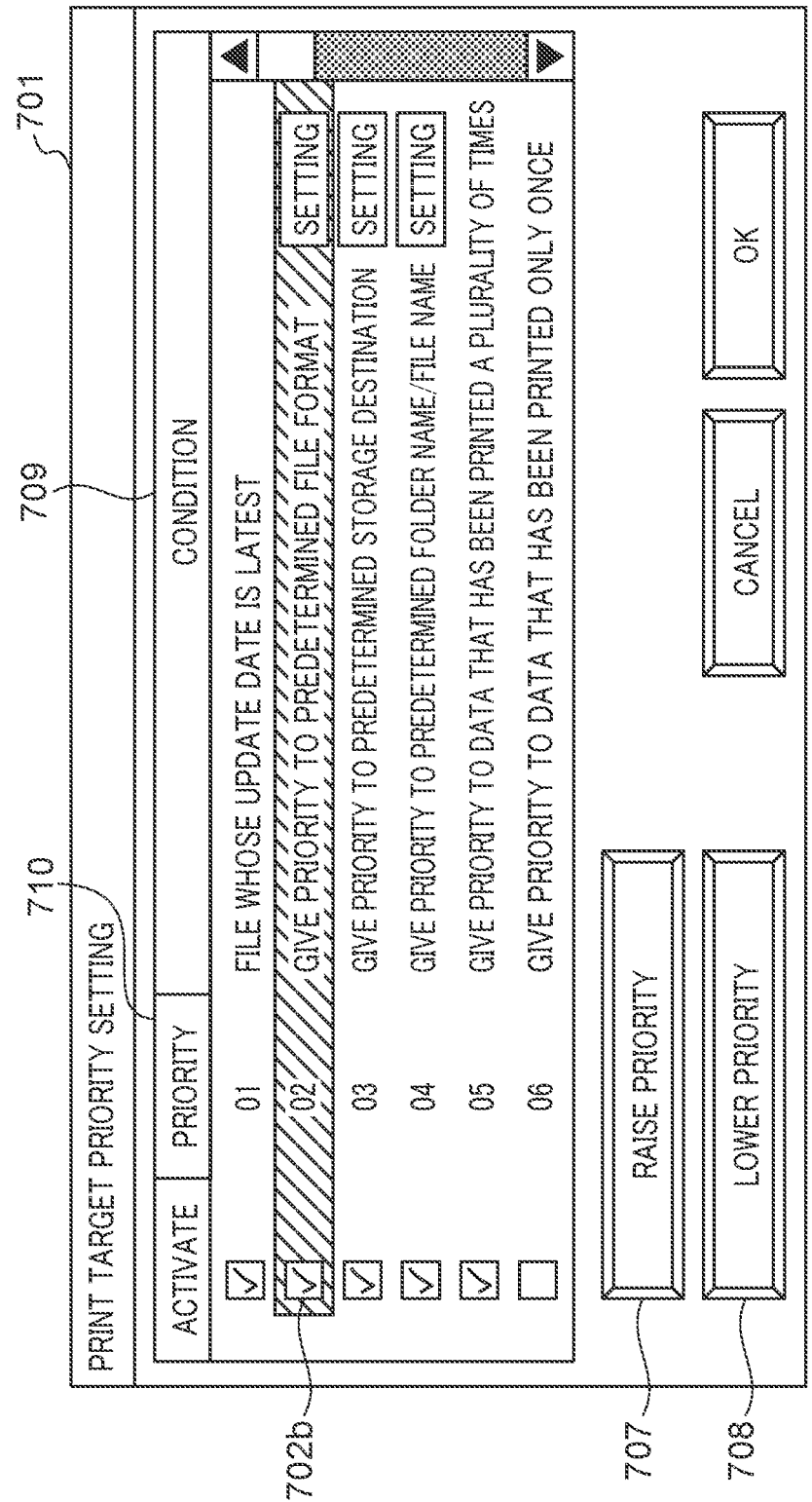
Figure 7C:
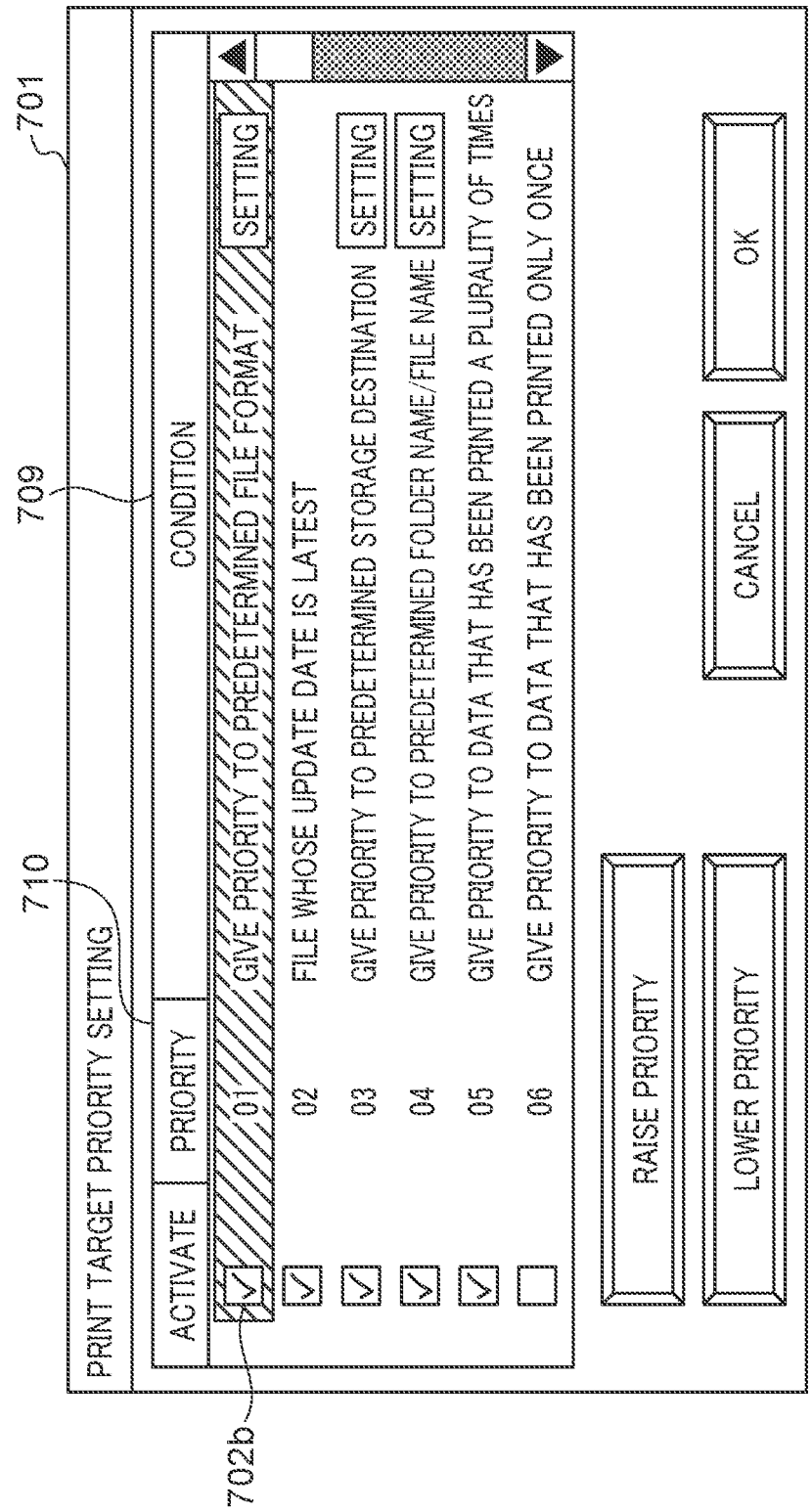

Further, a priority 710 of the condition 709 corresponding to the activating button in the selected state is displayed on the setting screen 701, and this priority can be changed. For example, when the activating button 702b is pressed and the activating button 702b is switched to the selected state, as shown in FIG. 7B, the color of a region corresponding to the activating button 702b is inverted and an activated state is set. Subsequently, for example, when a "raise priority" button 707 is pressed, as shown in FIG. 7C, the priority 710 of the condition 709 corresponding to the activating button 702b is raised one rank. On the other hand, when a "lower priority" button 708 is pressed, the priority 710 of the condition 709 corresponding to the activating button 702b is lowered one rank. When the OK button 703 is pressed, set values that are set by the setting screen 701 in this way are stored in the HDD 217 as the print target priority setting.

In the first embodiment, the priorities 710 of files having a relatively high possibility of being selected as a print target by the user (hereinafter referred to as "print desired degree"), are set higher than the priorities 710 of other files. For example, the files having a relatively high print desired degree include the user authentication information corresponding files whose update date and time are the latest, the user authentication information corresponding files that have a predetermined file format set in advance, the user authentication information corresponding files that are stored in a predetermined folder within the cloud storage 102 set in advance, the user authentication information corresponding files that have a name set in advance, and the user authentication information corresponding files that have been printed a plurality of times. Further, the priorities 710 of files having a relatively low print desired degree, are set lower than the priorities 710 of other files. For example, the files having a relatively low print desired degree include the user authentication information corresponding files that have been printed only once.

Returning to FIG. 6, the CPU 214 performs a sort processing with respect to the file list obtained in the step S404 on the basis of the print target priority setting (a step S602). In the sort processing, the CPU 214 sorts an arrangement order of names of a plurality of user authentication information corresponding files included in the file list in the descending order of the priorities 710 of the print target priority setting. Next, the CPU 214 that functions as a list generating unit generates a print candidate file list, in which the names of the plurality of user authentication information corresponding files are arranged in the descending order of the priorities 710 of the print target priority setting (a step S603), and stores the print candidate file list in RAM 216.

Returning to FIG. 4, when the print candidate file estimating processing is completed, the CPU 214 transmits a request to obtain print candidate files shown in the print candidate file list to the cloud storage 102 (a step S406). The cloud storage 102 responds to the request to obtain the print candidate files received from the printing management device 104 (a step S407). Specifically, the cloud storage 102 transmits user authentication information corresponding files corresponding to the above obtaining request to the printing management device 104 as the print candidate files.

The CPU 214 of the printing management device 104 that functions as a file obtaining unit obtains the print candidate files from the cloud storage 102 (a step S408), and stores the obtained print candidate files in the HDD 217. Further, the CPU 214 that functions as a transmission unit transmits the print candidate files to the multifunction peripheral 101 according to the arrangement order of the names of the files in the print candidate file list (a step S409).

The CPU 201 of the multifunction peripheral 101 obtains the print candidate files from the printing management device 104 (a step S410), and retains the print candidate files in the HDD 204 (a step S411). Next, the CPU 201 displays the reservation printing function screen 801 of FIG. 8 on the operating panel 212 (a step S412).

The reservation printing function screen 801 is a screen for the user to instruct the execution of printing of files reserved in the multifunction peripheral 101, and includes a received print data list 802 and the estimated print data list 803. In the received print data list 802, a list of files transmitted from the PC 103 or the like according to the user's instruction and temporarily retained (reserved) in the HDD 204 is displayed. In the estimated print data list 803, names of the print candidate files obtained from the printing management device 104 in the step S410, are displayed in an order of reception from the printing management device 104. That is, in the estimated print data list 803, the names of the plurality of user authentication information corresponding files are displayed in an order of being sorted in the descending order of the priority 710 of the print target priority setting. Specifically, in the estimated print data list 803, based on the priority 710, print candidate files having a relatively high print desired degree are displayed on a priority basis. For example, the user authentication information corresponding files whose update date and time are the latest, the user authentication information corresponding files that have a predetermined file format set in advance, the user authentication information corresponding files that are stored in a predetermined folder within the cloud storage 102 set in advance, the user authentication information corresponding files that have a name set in advance, the user authentication information corresponding files that have been printed a plurality of times, etc. are displayed higher than other print candidate files. On the other hand, in the estimated print data list 803, print candidate files having a relatively low print desired degree, for example, the user authentication information corresponding files that have been printed only once are displayed lower than other print candidate files.

When the CPU 201 receives a print execution instruction of selecting a check box corresponding to a file that the user desires and pressing a print button 804 on the reservation printing function screen 801 (a step S413), the CPU 201 executes printing of the file corresponding to the selected check box (a step S414).

According to the above-described first embodiment, the printing management device 104 obtains user authentication information corresponding files shown in the print candidate file list generated based on the print target priority setting among the plurality of files stored in the cloud storage 102 from the cloud storage 102, and transmits the obtained user authentication information corresponding files to the multifunction peripheral 101. That is, in the reservation printing, it is not necessary for the user to issue an instruction that transmits the user authentication information corresponding files stored in the cloud storage 102 to the multifunction peripheral 101. As a result, it is possible to reduce labor and time for the instruction in the reservation printing.

In the above-described first embodiment, when the user logged into the multifunction peripheral 101, the printing management device 104 obtains the user authentication information corresponding files shown in the print candidate file list, and transmits the obtained user authentication information corresponding files to the multifunction peripheral 101. As a result, it is possible to reserve the user authentication information corresponding files stored in the cloud storage 102 in the multifunction peripheral 101 only by the user performing an operation for logging into the multifunction peripheral 101.

In the above-described first embodiment, the user authentication information corresponding files are files corresponding to user authentication information inputted when logging into the multifunction peripheral 101 among the plurality of files stored in the cloud storage 102. As a result, it is possible to reserve files corresponding to the user who logged into the multifunction peripheral 101 among the plurality of files stored in the cloud storage 102 in the multifunction peripheral 101 without any instruction from the user.

In the above-described first embodiment, the printing management device 104 generates the print candidate files. As a result, it is possible to promptly start the processing of obtaining the user authentication information corresponding files from the cloud storage 102 on the basis of the generated print candidate files.

Further, in the above-described first embodiment, the print target priority setting includes a setting relating to the display order of the files in the estimated print data list 803 that is displayed on the operating panel 212 of the multifunction peripheral 101. As a result, it is possible to control the display order of the files in the estimated print data list 803 so that the user can easily find the file being the print target.

In the above-described first embodiment, the print target priority setting includes a setting that displays the print candidate files having a relatively high print desired degree among the obtained user authentication information corresponding files at the top. The print candidate files having a relatively high print desired degree include the user authentication information corresponding files whose update date and time are the latest, the user authentication information corresponding files that are stored in a predetermined folder within the cloud storage 102 set in advance, the user authentication information corresponding files that have a name set in advance, and the user authentication information corresponding files that have been printed a plurality of times. As a result, it is possible to perform a list display that the user can easily find the file being the print target.

Further, in the above-described first embodiment, the print target priority setting includes a setting that displays the print candidate files having a relatively low print desired degree among the obtained user authentication information corresponding files at the bottom. The print candidate files having a relatively low print desired degree include the user authentication information corresponding files that have been printed only once. As a result, it is possible to prevent the print candidate files having a relatively low print desired degree from being displayed at the top and making it difficult for the user to find the file being the print target.

Next, an image forming apparatus according to a second embodiment of the present disclosure will be described.

Configurations, operations and effects of the second embodiment are basically the same as those of the first embodiment described above. It differs from the above-described first embodiment that in the second embodiment, the printing management device 104 periodically obtains print candidate files from the cloud storage 102 before the user logs into the multifunction peripheral 101. Therefore, descriptions of duplicate configurations, operations and effects are omitted. Hereinafter different configurations, operations and effects will be described.

Here, in the above-described first embodiment, after the login processing of the multifunction peripheral 101 is completed, the printing management device 104 obtains user authentication information corresponding files to be transmitted to the multifunction peripheral 101 from the cloud storage 102. Therefore, it takes a certain amount of time from the user inputting the user authentication information until the multifunction peripheral 101 completes the reception of the user authentication information corresponding files. As a result, it is impossible for the multifunction peripheral 101 to display a list of print candidate files immediately after the user logged into the multifunction peripheral 101.

In contrast, in the second embodiment, the printing management device 104 periodically performs a processing that obtains user authentication information corresponding files shown in a print candidate file list among a plurality of files stored in the cloud storage 102 from the cloud storage 102 and transmits the obtained user authentication information corresponding files to the multifunction peripheral 101.

Figure 9:
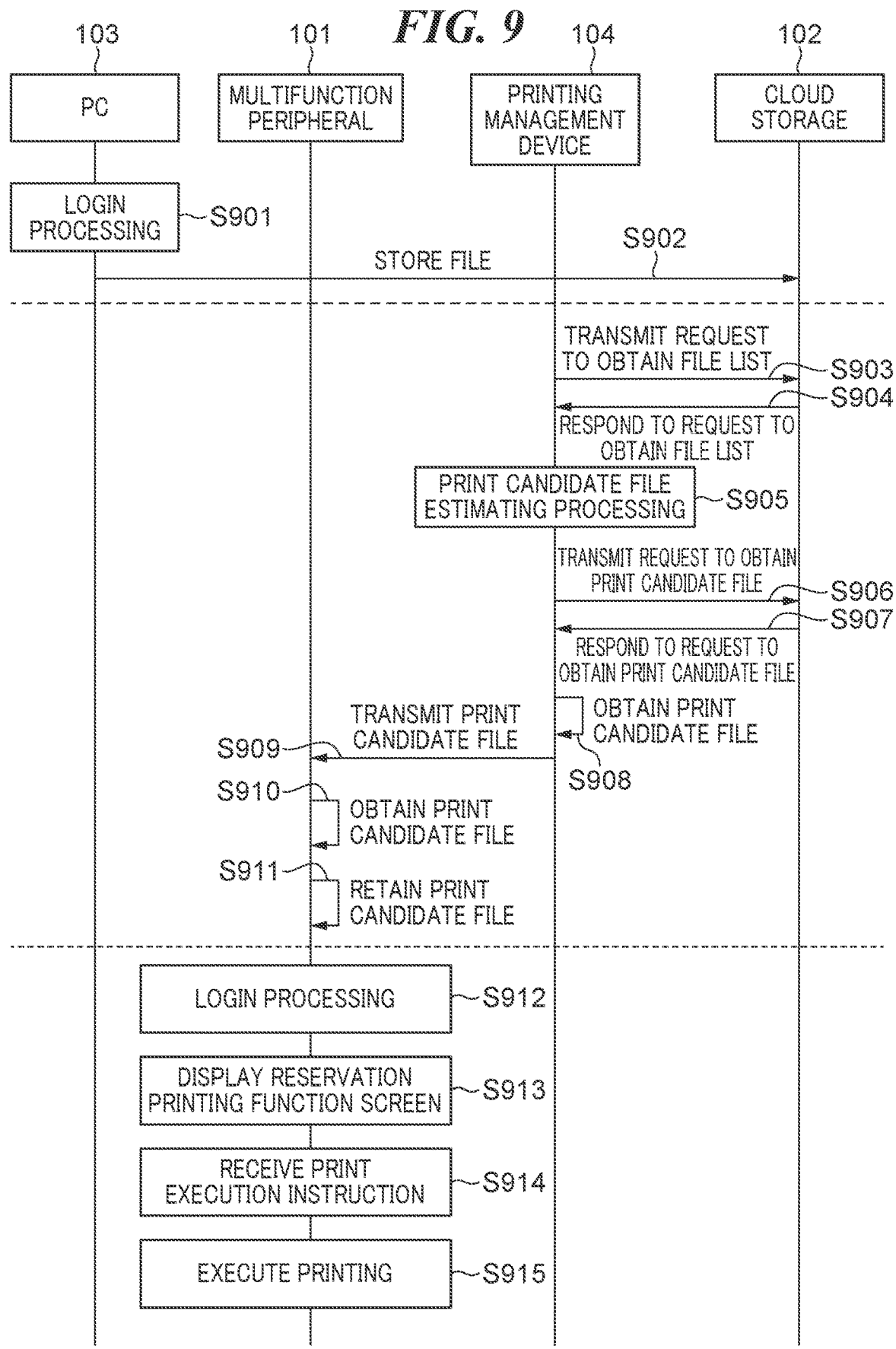
FIG. 9 is a sequence diagram for explaining a series of flows from storing a file generated by the user operating the PC to a cloud storage to executing the print processing in a second embodiment.

FIG. 9 is a sequence diagram for explaining a series of flows from storing a file generated by the user operating the PC 103 to the cloud storage 102 to executing the print processing in the printing system 100 of FIG. 1. In FIG. 9, each processing executed by the multifunction peripheral 101 is realized by the CPU 201 of the multifunction peripheral 101 executing the program expanded in the RAM 203. Further, in FIG. 9, each processing executed by the printing management device 104 is realized by the CPU 214 of the printing management device 104 executing the program expanded in the RAM 216.

As shown in FIG. 9, at first, the PC 103 executes a login processing (a step S901), and stores files generated by a logged-in user in the cloud storage 102 (a step S902).

On the other hand, the CPU 214 of the printing management device 104 transmits a request to obtain a file list, which is list information of files stored in the cloud storage 102, to the cloud storage 102 (a step S903). This file list includes names, file formats, update date and time, etc. of all files stored in the cloud storage 102. Moreover, the above file list may include only information about files stored in a predetermined folder within the cloud storage 102 set in advance, instead of information about all the files stored in the cloud storage 102. Further, the above file list may not include information about non-printable files such as files having a "zip" extension. In the second embodiment, the CPU 214 transmits the file list obtaining request to the cloud storage 102 periodically, for example, at predetermined intervals such as every 10 minutes. Or, the CPU 214 transmits the file list obtaining request to the cloud storage 102 based on the reception of a file change notification indicating that the file has been updated or a new file has been stored from the cloud storage 102.

The cloud storage 102 responds to the file list obtaining request received from the printing management device 104 (a step S904). Specifically, the cloud storage 102 transmits a file list corresponding to the file list obtaining request to the printing management device 104. Next, the CPU 214 of the printing management device 104 executes a print candidate file estimating processing of FIG. 10 on the basis of a file list received from the cloud storage 102 (a step S905).

FIG. 10 is a flowchart that shows procedures of the print candidate file estimating processing of the step S905 of FIG. 9. Further, in the print candidate file estimating processing of FIG. 10, as with the print candidate file estimating processing of FIG. 6, it is assumed that a print target priority setting is already stored in the HDD 217. Furthermore, in the print candidate file estimating processing of FIG. 10, it is assumed that the printing management device 104 retains files obtained in the past from the cloud storage 102.

As shown in FIG. 10, the CPU 214 compares the file list received from the cloud storage 102 with the files obtained in the past from the cloud storage 102, and determines whether or not the print candidate file has been updated (a step S1001). In the step S1001, for example, in a first case that the name of a new file that has not been obtained in the past is included in the file list, or in a second case of being determined that the file obtained in the past has been updated based on the update date and time included in the file list, the CPU 214 determines that the print candidate file has been updated. On the other hand, in a case other than the first case and the second case, the CPU 214 determines that the print candidate file has not been updated.

If a result of a determination in the step S1001 is that the print candidate file has not been updated, the print candidate file estimating processing ends. If the result of the determination in the step S1001 is that the print candidate file has been updated, the CPU 214 obtains the print target priority setting from the HDD 217 (a step S1002). Next, the CPU 214 performs a sort processing with respect to the file list obtained in the step S904 on the basis of the print target priority setting (a step S1003). In this sort processing, the CPU 214 sorts an arrangement order of names of a plurality of files included in the file list in the descending order of the priorities 710 of the print target priority setting. Next, the CPU 214 generates a print candidate file list, in which the names of the above plurality of files are arranged in the descending order of the priorities 710 of the print target priority setting (a step S1004), and stores the print candidate file list in RAM 216, and then the print candidate file estimating processing ends.

Returning to FIG. 9, when the print candidate file estimating processing is completed, the CPU 214 transmits a request to obtain print candidate files shown in the print candidate file list to the cloud storage 102 (a step S906). The cloud storage 102 responds to the request to obtain the print candidate files received from the printing management device 104 (a step S907). Specifically, the cloud storage 102 transmits files corresponding to the above obtaining request to the printing management device 104 as the print candidate files. The CPU 214 of the printing management device 104 obtains the print candidate files from the cloud storage 102 (a step S908). Next, the CPU 214 transmits the obtained print candidate files to the multifunction peripheral 101 according to the arrangement order of the names of the files in the print candidate file list (a step S909).

The CPU 201 of the multifunction peripheral 101 obtains the print candidate files from the printing management device 104 (a step S910), and retains the obtained print candidate files in the HDD 204 (a step S911). In this way, in the second embodiment, before the user logs into the multifunction peripheral 101, it becomes possible for the multifunction peripheral 101 to obtain files retained in the cloud storage 102 and immediately execute printing of the files. Next, when the CPU 201 receives the login request from the user, according to the login request, the CPU 201 executes the login processing in the same manner as the step S401 (a step S912). Next, the CPU 201 displays the reservation printing function screen 801 that includes a list of received print candidate files on the operating panel 212 (a step S913). In an estimated print data list 803 of this reservation printing function screen 801, as with the above-described first embodiment, names of the print candidate files obtained from the printing management device 104 in the step S910, are displayed in an order of reception from the printing management device 104. Next, when the CPU 201 receives a print execution instruction that the user selects one of check boxes corresponding to each file and presses the print button 804 on the reservation printing function screen 801 (a step S914), the CPU 201 executes printing of the file corresponding to the selected check box (a step S915).

In the above-described second embodiment, the printing management device 104 periodically performs the processing that obtains the user authentication information corresponding files shown in the print candidate file list among the plurality of files stored in the cloud storage 102 and transmits the obtained user authentication information corresponding files to the multifunction peripheral 101. As a result, it is possible to reduce labor and time for the instruction in the reservation printing, furthermore, it is possible to display a list of print candidate files immediately on the operating panel 212 of the multifunction peripheral 101 after the user logged into the multifunction peripheral 101.

Although various embodiments of the present disclosure have been described above with reference to the Figures, the present invention is not limited to the above-described embodiments. For example, various embodiments of the present disclosure may be configured such that the multifunction peripheral 101 obtains the print candidate file list from the printing management device 104 and displays names of files in the estimated print data list 803 according to the arrangement order of the names of the files in the obtained print candidate file list.

In the above-described embodiments, the multifunction peripheral 101 may be configured to have functions of the printing management device 104 instead of the multifunction peripheral 101 and the printing management device 104 that are separate devices. That is, the multifunction peripheral 101 executes each processing executed by the printing management device 104 in FIGS. 4, 6, 9 and 10, and the setting screen 701 is displayed on the operating panel 212 of the multifunction peripheral 101. By such a configuration, it is possible to obtain the same effect as that of the above-described embodiments.

Further, in the above-described embodiments, although the configuration that the server is one cloud storage 102 has been described, the configuration of the server is not limited to this. For example, the server may be an on-premise file server or may be a plurality of cloud storages.

In the above-described embodiments, although the case that the image forming apparatus is a multifunction peripheral (a digital multifunction peripheral/a MFP) has been described, the image forming apparatus in embodiments of the present disclosure is not limited to the multifunction peripheral. The image forming apparatus in embodiments or the present disclosure may be, for example, a printing apparatus such as an SFP (Single Function Peripheral) that performs reservation printing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-149261, filed Sep. 4, 2020, which is hereby incorporated by reference herein in its entirety.

What is claimed is:

1. An information processing apparatus that performs communication with a server for storing files and an image forming apparatus for printing files, comprising:
    a controller that obtains one or more files indicated by a print candidate information generated based on priorities of files stored in the server among a plurality of files stored in the server, wherein the controller sets the priorities based on a number of times that each of the stored files has been printed; and
    a communicator that transmits the obtained one or more files to the image forming apparatus,
    wherein a file selected from the transmitted one or more files is printed by the image forming apparatus.

2. The information processing apparatus according to claim 1,
    wherein when it is detected that a user logged into the image forming apparatus, the controller obtains the one or more files indicated by the print candidate information, and the communicator transmits the obtained one or more files.

3. The information processing apparatus according to claim 2:
    wherein the controller obtains user authentication information inputted for logging into the image forming apparatus, and
    wherein the print candidate information is information about one or more files corresponding to the user authentication information.

4. The information processing apparatus according to claim 1,
    wherein the controller generates the print candidate information.

5. The information processing apparatus according to claim 1,
    wherein a list of one or more files transmitted by the communicator is displayed on a display device of the image forming apparatus.

6. The information processing apparatus according to claim 5,
    wherein the list of one or more files is displayed in order based on the priorities on the display device.

7. The information processing apparatus according to claim 5, wherein a file that has been printed a highest number of times of the one or more files is displayed at the top of the list.

8. A control method for an information processing apparatus that performs communication with a server for storing files and an image forming apparatus for printing files, comprising:

obtaining one or more files indicated by a print candidate information generated based on priorities of files stored in the server among a plurality of files stored in the server, wherein the priorities is set based on a number of times that each of the stored files has been printed; and transmitting the obtained one or more files to the image forming apparatus, wherein a file selected from the transmitted one or more files is printed by the image forming apparatus.

* * * * *